(12) United States Patent
Bell et al.

(10) Patent No.: US 9,194,223 B2
(45) Date of Patent: *Nov. 24, 2015

(54) METHOD OF FRACTURING SUBTERRANEAN FORMATIONS WITH CROSSLINKED FLUID

(71) Applicant: Baker Hughes Incorporated, Houston, TX (US)

(72) Inventors: Charles Elmer Bell, Rockwall, TX (US); Harold Dean Brannon, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/764,638

(22) Filed: Feb. 11, 2013

(65) Prior Publication Data

US 2013/0153233 A1    Jun. 20, 2013

Related U.S. Application Data

(63) Continuation-in-part of application No. 12/642,662, filed on Dec. 18, 2009, now Pat. No. 8,371,383.

(51) Int. Cl.
*E21B 43/267* (2006.01)
*C09K 8/68* (2006.01)
(Continued)

(52) U.S. Cl.
CPC .............. *E21B 43/267* (2013.01); *C09K 8/685* (2013.01); *C09K 8/80* (2013.01); *C09K 8/805* (2013.01); *C09K 8/90* (2013.01)

(58) Field of Classification Search
CPC .................................................... E21B 43/267
See application file for complete search history.

(56) References Cited

U.S. PATENT DOCUMENTS 3,058,909 A   10/1962   Kern
3,215,634 A   11/1965   Walker
(Continued)

FOREIGN PATENT DOCUMENTS

WO   2006095291 A1   9/2006
WO   2011075629 A1   6/2011

OTHER PUBLICATIONS

Charles E. Bell, Harold Dean Brannon; "Redesigning Fracturing Fluids for Improving reliability and Well Performance in Horizontal Tight Gas Shale Applications"; SPE140107; Jan. 2011; 9 pgs; Society of Petroleum Engineers; The Woodlands, Texas.
(Continued)

*Primary Examiner* — Doug Hutton, Jr.
*Assistant Examiner* — Crystal J Miller
(74) *Attorney, Agent, or Firm* — John Wilson Jones; Jones & Smith, LLP

(57) ABSTRACT

Subterranean formations, such as tight gas formations, may be subjected to hydraulic fracturing by introducing into the formation a fracturing fluid of an aqueous fluid, a hydratable polymer, a crosslinking agent and proppant. The fluid enters the reservoir through an entrance site. The apparent viscosity of the fluid decreases distally from the entrance site such that at in situ conditions:
  (a) the apparent viscosity of the fracturing fluid 100 feet from the entrance site is less than 10 percent of the apparent viscosity of the fracturing fluid at the entrance site;
  (b) the apparent viscosity of the fracturing fluid 15 minutes after introduction into the entrance site is less than 15% of the apparent viscosity of the fracturing fluid at the entrance site; and/or
  (c) the apparent viscosity of the fracturing fluid is less than 10 cP within 15 minutes after being introduced through the entrance site.

24 Claims, 6 Drawing Sheets

(51) Int. Cl.
*C09K 8/80* (2006.01)
*C09K 8/90* (2006.01)

(56) References Cited

U.S. PATENT DOCUMENTS

| | | | |
|---|---|---|---|
| 3,743,613 A | 7/1973 | Coulter et al. | |
| 3,974,077 A | 8/1976 | Free | |
| 4,242,098 A | 12/1980 | Braun et al. | |
| 4,336,145 A | 6/1982 | Briscoe | |
| 4,579,942 A | 4/1986 | Brode et al. | |
| 4,619,776 A * | 10/1986 | Mondshine | 507/211 |
| 4,801,389 A | 1/1989 | Brannon et al. | |
| 4,990,268 A * | 2/1991 | Burba et al. | 507/108 |
| 5,067,566 A | 11/1991 | Dawson | |
| 5,082,579 A | 1/1992 | Dawson | |
| 5,145,590 A | 9/1992 | Dawson | |
| 5,160,643 A | 11/1992 | Dawson | |
| 5,201,370 A | 4/1993 | Tjon-Joe-Pin | |
| 5,224,544 A | 7/1993 | Tjon-Joe-Pin et al. | |
| 5,226,479 A | 7/1993 | Gupta et al. | |
| 5,226,481 A | 7/1993 | Le et al. | |
| 5,252,235 A | 10/1993 | Sharif | |
| 5,253,711 A | 10/1993 | Mondshine | |
| 5,259,455 A | 11/1993 | Nimerick et al. | |
| 5,310,002 A * | 5/1994 | Blauch et al. | 166/307 |
| 5,445,223 A | 8/1995 | Nelson et al. | |
| 5,447,199 A | 9/1995 | Dawson et al. | |
| 5,551,516 A * | 9/1996 | Norman et al. | 166/308.2 |
| 5,562,160 A * | 10/1996 | Brannon et al. | 166/250.1 |
| 5,566,759 A | 10/1996 | Tjon-Joe-Pin et al. | |
| 5,624,886 A | 4/1997 | Dawson et al. | |
| 5,681,796 A | 10/1997 | Nimerick | |
| 5,806,597 A | 9/1998 | Tjon-Joe-Pin et al. | |
| 5,813,466 A | 9/1998 | Harris et al. | |
| 5,981,446 A | 11/1999 | Qiu et al. | |
| 6,017,855 A | 1/2000 | Le et al. | |
| 6,024,170 A | 2/2000 | McCabe et al. | |
| 6,035,936 A | 3/2000 | Whalen | |
| 6,138,760 A | 10/2000 | Lopez et al. | |
| 6,177,385 B1 | 1/2001 | Nimerick | |
| 6,186,235 B1 | 2/2001 | Tjon-Joe-Pin | |
| 6,230,805 B1 * | 5/2001 | Vercaemer et al. | 166/300 |
| 6,251,838 B1 | 6/2001 | Moorhouse et al. | |
| 6,348,590 B1 * | 2/2002 | Karstens et al. | 536/114 |
| 6,383,990 B1 * | 5/2002 | Dawson et al. | 507/209 |
| 6,387,853 B1 * | 5/2002 | Dawson et al. | 507/211 |
| 6,620,769 B1 | 9/2003 | Juppe et al. | |
| 6,642,185 B2 * | 11/2003 | Crews | 507/273 |
| 6,649,572 B2 * | 11/2003 | Dawson et al. | 507/209 |
| 6,767,868 B2 * | 7/2004 | Dawson et al. | 507/236 |
| 6,793,018 B2 * | 9/2004 | Dawson et al. | 166/300 |
| 6,810,959 B1 * | 11/2004 | Qu et al. | 166/300 |
| 6,844,296 B2 * | 1/2005 | Dawson et al. | 507/211 |
| 6,860,328 B2 * | 3/2005 | Gonzalez et al. | 166/280.1 |
| 7,007,757 B2 | 3/2006 | Gupta et al. | |
| 7,012,044 B2 * | 3/2006 | Dawson et al. | 507/211 |
| 7,207,386 B2 * | 4/2007 | Brannon et al. | 166/280.2 |
| 7,210,528 B1 * | 5/2007 | Brannon et | 507/140 |
| 7,223,719 B1 * | 5/2007 | Carpenter | 507/277 |
| 7,259,192 B2 | 8/2007 | Liu et al. | |
| 7,303,018 B2 | 12/2007 | Cawiezel et al. | |
| 7,427,583 B2 * | 9/2008 | Couillet et al. | 507/211 |
| 7,584,791 B2 * | 9/2009 | Robb et al. | 166/279 |
| 7,603,896 B2 | 10/2009 | Kalfayan et al. | |
| 7,624,805 B2 | 12/2009 | Hoppe et al. | |
| 8,205,675 B2 * | 6/2012 | Brannon et al. | 166/308.3 |
| 8,371,383 B2 * | 2/2013 | Bell et al. | 166/300 |
| 8,424,368 B2 * | 4/2013 | Tonmukayakul et al. | 73/61.66 |
| 8,899,332 B2 * | 12/2014 | Brannon et al. | 166/308.1 |
| 2003/0008778 A1 | 1/2003 | Donaldson et al. | |
| 2004/0206497 A1 * | 10/2004 | Gonzalez et al. | 166/271 |
| 2005/0137095 A1 | 6/2005 | Cawiezel et al. | |
| 2005/0272612 A1 * | 12/2005 | Dawson et al. | 507/211 |
| 2006/0065398 A1 | 3/2006 | Brannon et al. | |
| 2006/0196667 A1 * | 9/2006 | Alba et al. | 166/308.1 |
| 2008/0190603 A1 * | 8/2008 | Brannon | 166/250.1 |
| 2008/0190619 A1 * | 8/2008 | Brannon et al. | 166/308.2 |
| 2009/0095472 A1 * | 4/2009 | Andersson et al. | 166/280.1 |
| 2009/0120647 A1 | 5/2009 | Turick et al. | |
| 2010/0018707 A1 | 1/2010 | Wheeler et al. | |
| 2010/0089580 A1 * | 4/2010 | Brannon et al. | 166/280.2 |
| 2010/0204069 A1 * | 8/2010 | Le et al. | 507/213 |
| 2011/0015100 A1 * | 1/2011 | Sun et al. | 507/211 |
| 2011/0030961 A1 * | 2/2011 | Maxey | 166/310 |
| 2011/0092695 A1 * | 4/2011 | Deysarkar et al. | 536/114 |
| 2012/0055670 A1 | 3/2012 | Armstrong | |
| 2013/0014946 A1 * | 1/2013 | Makarychev-Mikhailov et al. | 166/280.2 |
| 2013/0112413 A1 * | 5/2013 | Muthusamy et al. | 166/300 |
| 2013/0133892 A1 * | 5/2013 | Salgaonkar et al. | 166/310 |
| 2013/0333886 A1 * | 12/2013 | George et al. | 166/278 |
| 2014/0144630 A1 * | 5/2014 | Liang et al. | 166/280.2 |
| 2014/0262263 A1 * | 9/2014 | Yudin et al. | 166/280.1 |
| 2014/0367100 A1 * | 12/2014 | Oliveira et al. | 166/280.1 |
| 2015/0041132 A1 * | 2/2015 | Nelson et al. | 166/280.1 |
| 2015/0041139 A1 * | 2/2015 | Zhou et al. | 166/308.5 |
| 2015/0060064 A1 * | 3/2015 | Lafferty et al. | 166/280.1 |

OTHER PUBLICATIONS

Harold D. Brannon, Charles E. Bell; "Eliminating Slickwater Compromises for Improve Shale Stimulation"; SPE147485; Oct. 2011; 12 pgs; Society of Petroleum Engineers; Denver Colorado.

* cited by examiner

METHOD OF FRACTURING SUBTERRANEAN FORMATIONS WITH CROSSLINKED FLUID

This application is a continuation-in-part application of U.S. patent application Ser. No. 12/642,662, filed on Dec. 18, 2009.

FIELD OF THE INVENTION

The invention relates to a method of fracturing a subterranean formation with an aqueous fluid which contains a hydratable polymer and a crosslinking agent wherein the apparent viscosity of the fluid decreases distally from the entrance site of the reservoir.

BACKGROUND OF THE INVENTION

Hydraulic fracturing often requires the use of well treating materials capable of enhancing the production of fluids and natural gas from low permeability formations. In a typical hydraulic fracturing treatment, a fracturing treatment fluid containing a solid proppant is injected into the formation at a pressure sufficiently high enough to cause the formation or enlargement of fractures in the reservoir. The fractures radiate outwardly from the wellbore, typically from a few meters to hundreds of meters, and extend the surface area from which oil or gas drains into the well. The proppant is deposited in the fracture, where it remains after the treatment is completed. After deposition, the proppant serves to prevent closure of the fracture and to form a conductive channel extending from the wellbore into the formation being treated. As such, the proppant enhances the ability of fluids or natural gas to migrate from the formation to the wellbore through the fracture.

Many different materials have been used as proppants including sand, glass beads, walnut hulls, and metal shot as well as resin-coated sands, intermediate strength ceramics, and sintered bauxite; each employed for their ability to cost effectively withstand the respective reservoir closure stress environment. The apparent specific gravity (ASG) of these materials is indicative of relative strength; the ASG of sand being 2.65 and the ASG of sintered bauxite being 3.4. While increasing ASG provides greater strength, it also increases the degree of difficulty of proppant transport and reduces propped fracture volume. Fracture conductivity is therefore often reduced by the use of materials having high ASG. More recently, attention has been drawn to the use of ultra lightweight (ULW) materials as proppant materials. Such materials have an apparent specific gravity (ASG) less than or equal to 2.45.

It is generally desirable for the fracturing fluid to reach maximum viscosity as it enters the fracture. The viscosity of most fracturing fluids may be attributable to the presence of a viscosifying agent, such as a viscoelastic surfactant or a viscosifying polymer, in the fluid. Conventional viscosifying polymers include such water-soluble polysaccharides as galactomannans and cellulose derivatives. The presence of a crosslinking agent, such as one which contains borate (or generates borate), titanate, or zirconium ions, in the fracturing fluid can further increase the viscosity. The increased viscosity of the gelled fracturing fluid affects both fracture length and width, and serves to place the proppant within the produced fracture.

Recently, low viscosity fluids (such as water, salt brine and slickwater) which do not contain a viscoelastic surfactant or viscosifying polymer have been used in the stimulation of low permeability formations. Such formations are also known as tight formations (including tight gas shale reservoirs exhibiting complex natural fracture networks). To effectively access tight formations wells are often drilled horizontally and then subjected to one or more fracture treatments to stimulate production. Fractures propagated with low viscosity fluids exhibit smaller fracture widths than experienced with relatively higher viscosity fluids, resulting in development of greater created fracture area from which the hydrocarbons can flow into the high conductive fracture pathways. In low permeability reservoirs, fracture area is generally considered proportional to the effectiveness of the fracture stimulation. Therefore, low viscosity fluids are generally preferred for stimulation of tight gas shale reservoirs.

Slickwater fluids are basically fresh water or brine having sufficient friction reducing agent to minimize tubular friction pressures. Generally, such fluids have viscosities only slightly higher than unadulterated fresh water or brine; typically, the friction reduction agents present in slickwater do not increase the viscosity of the fracturing fluid by any more than 1 to 2 cP. Such fluids are much cheaper than conventional fracturing fluids which contain a viscosifying agent. In addition, their characteristic low viscosity facilitates reduced fracture height growth in the reservoir during stimulation. Further, such fluids introduce less damage into the formation in light of the absence of a viscosifying polymer and/or viscoelastic surfactant in the fluid.

While the use of low viscosity fluids is desirable for use in the stimulation of low permeability formations, the pumping of proppant-laden slickwater fluids has proven to be costly since proppant consistently settles in the manifold lines before the fluid reaches the wellhead. This is particularly evident when the fracturing fluid contains a higher concentration of proppant and/or when the proppant employed has an ASG in excess of 2.45. Such materials are very likely to settle in the manifolds before the fluid ever reaches the wellhead. Since proppant settling is affected by the viscosity of the treatment fluid, a high pump velocity is required to prevent settling. However, under certain conditions rate alone is insufficient to prevent settling as settling is also dependent on proppant size and specific gravity. Further, since manifolds have different dimensions, mere modification of fluid pump rate in one area may not address the problem in another.

In addition to the settling of proppant in the manifold lines, there is a real danger of proppant settling inside the fluid end of the pump. Within the pump, pistons move under a sinusoidal wave pattern. As such, the pistons move slowly, then faster, then slow and then stop momentarily. The process repeats for each of the pistons. Settling of proppant in the housing of the pump may damage the pistons as the pistons attempt to move or crush the proppant. This is particularly a problem when proppants are composed of high compressive strength, such as ceramics.

Proppant settling from low viscosity treating fluids within the horizontal section of the wellbore is also of concern. Such settling can occur as a result of insufficient slurry flow velocity and/or insufficient viscosity to suspend the proppant. Excessive proppant settling within a horizontal wellbore can necessitate cessation of fracturing treatments prior to placement of the desired volumes. In order to mitigate settling issues, high pumping rates are typically employed to effectively suspend the proppant for transport within the horizontal wellbore section. However, high pumping rates can result in higher than desirable treating pressures and excessive fracture height growth.

Alternatives are desired therefore for proppant-laden fracturing fluids which provide the benefits of slickwater in tight gas reservoirs but which do not cause damage to pumping equipment or do not allow for proppant settling in horizontal wellbores.

SUMMARY OF THE INVENTION

A method of fracturing having particular applicability in tight gas reservoirs consists of mixing water and a viscosifying polymer, crosslinking agent and proppant and introducing the viscous fluid into the wellhead. The viscosity of the fracturing fluid when pumped into the wellhead may be between from about 10 to about 120 cP at a temperature range between from about 80° F. to about 125° F. Increased viscosity at the surface protects the surface equipment when pumping the suspended proppant into the wellbore. In addition, the viscous nature of the fracturing fluid enables the fluid to transport the proppant to the perforating sites in the wellbore while minimizing settling.

The loading of the hydratable polymer in the fracturing fluid is from about 6 to about 18 pptg, preferably from about 6 to about 12 pptg. The low loading of the viscosifying polymer in the fracturing fluid causes the viscosity of the fluid to rapidly decrease upon entering the entrance site of perforation.

Even without breakers, the fluid is heat sensitive and degrades quickly such that the viscosity of the fluid within 100 feet from the perforation is no greater than about 5 cP, typically no greater than about 3 cP.

The viscosifying polymer is preferably a hydratable polymer including galactomannan gums, guars, derivatized guars, cellulose and cellulose derivatives, starch, starch derivatives, xanthan, derivatized xanthan and mixtures thereof. Particularly preferred viscosifying polymers are derivatized and underivatized guars having an intrinsic viscosity greater than about 14 dL/g, more typically greater than 16 dL/g.

The method described has particular applicability in low permeability reservoirs, such as those having permeabilities between from about 10 nanodarcies to about 1.0 mD, including shale and limestone.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

The fracturing method, defined by the invention, uses a fracturing fluid which is prepared by mixing an aqueous fluid, a hydratable polymer, a crosslinking agent and proppant (and buffering agent, if needed).

The mixing may occur in a blender. Blending may occur on-the-fly. Alternatively, one or more of the aqueous fluid, hydratable polymer, crosslinking agent and/or proppant may be mixed downstream of the blender. Further, it is possible that the mixing of the components may occur downhole.

In an embodiment, sufficient viscosity of the fluid is developed as the fluid is pumped into the wellhead such that proppant does may be transported to the wellhead and not settle from the fluid. As such, proppant settling in the manifold lines and the housing of the pump is minimized (to the extent that any settling occurs). Thus, unlike slickwater fluids, the fracturing fluids described herein minimize pump failures or damage to the pistons and/or manifolds of the pump.

Since the loading of polymer in the fracturing fluid is low, the apparent viscosity of the fluid dramatically decreases after it enters into the reservoir. For instance, at in-situ conditions, the apparent viscosity of the fracturing fluid 100 feet from the reservoir perforation sites (or entrance site) may be less than 10 percent of the apparent viscosity of the fracturing fluid at the entrance site of the reservoir. Preferably, the apparent viscosity of the fracturing fluid 100 feet from the entrance site is less than 5 percent of the viscosity of the fracturing fluid at the entrance site. More preferably, the apparent viscosity of the fluid 200 feet from the entrance site is less than 1 percent of the viscosity of the fracturing fluid at the entrance site.

Alternatively, the apparent viscosity of the fracturing fluid 15 minutes after introduction into the entrance site may be less than 15% of the apparent viscosity of the fracturing fluid at the reservoir entrance site. More typically, the apparent viscosity of the fracturing fluid 15 minutes after introduction into the entrance site is less than 10% of the apparent viscosity of the fracturing fluid at the entrance site. Alternatively, the apparent viscosity of the fracturing fluid 30 minutes after introduction into the entrance site is less than 5% of the apparent viscosity of the fracturing fluid at the entrance site.

In another embodiment, the apparent viscosity of the fracturing fluid may be less than 10 cP within 15 minutes after being introduced through the entrance site of the reservoir. More typically, the apparent viscosity of the fracturing fluid is less than 5 cP within 15 minutes after being introduced through the entrance site. Alternatively, the apparent viscosity of the fracturing fluid is less than 3 cP within 30 minutes after being introduced through the entrance site.

Figure 1:
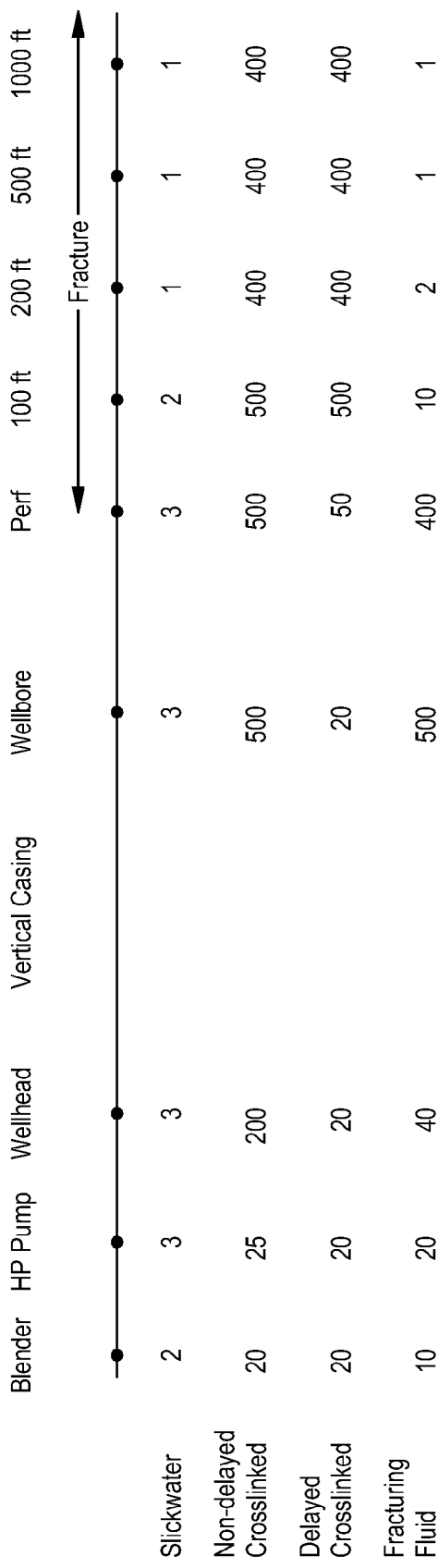
FIG. 1 is a schematic representation of the invention illustrating the viscosity profile of a fracturing fluid from the time the fluid is blended until the fluid travels distally 1,000 feet from the reservoir perforation site.

FIG. 1 illustrates a typical profile of the fracturing fluid defined herein as compared to fracturing fluids of the prior art. As illustrated, the fracturing fluid defined herein is labeled as "Fracturing Fluid". The Fracturing Fluid is compared to a conventional crosslinked gel which does not contain a delayed crosslinking agent and a conventional crosslinked gel which does contain a delayed crosslinking agent. In addition, the Fracturing Fluid is compared to slickwater. For each of the four fluids, it is assumed that an equivalent amount of proppant is in each fluid. The apparent viscosity of each of the fluids is then compared at the blender (where the crosslinking agent, hydratable polymer, proppant, and optionally a pH buffering agent, are mixed with the aqueous fluid), the high pressure pump where the fluid is pumped into the wellhead, at the wellhead itself and at the wellbore. The apparent viscosity is then shown at the perforation, 100 ft from the perforation, 200 ft from the perforation, 500 ft from the perforation and 1,000 ft from the perforation. The Fracturing Fluid is shown as having the approximate apparent viscosity as the delayed and non-delayed crosslinked fluids at the blender and high pressure pump. Further, the Fracturing Fluid is shown as having the approximate apparent viscosity as the delayed crosslinked fluid at the wellhead. At the wellbore and at the perforating site (entrance into the reservoir); the viscosity of the Fracturing Fluid approximates the viscosity of the conventional crosslinked fluid which does not contain a delayed crosslinking agent. As the Fracturing Fluid extends distally from the perforating site, the apparent viscosity of the Fracturing Fluid decreases. When the Fracturing Fluid is about 200 ft from the perforating entrance, the apparent viscosity of the Fracturing Fluid approximates the apparent viscosity of slickwater.

The viscosifying polymer of the fracturing fluid defined herein may be a thickening polymer such as a hydratable polymer like, for example, one or more polysaccharides capable of forming a crosslinked gel. These include galactomannan gums, guars, derivatized guars, cellulose and derivatized celluloses, starch, starch derivatives, xanthan, derivatized xanthan and mixtures thereof. Specific examples include, but are not limited to, guar gum, guar gum derivative, locust bean gum, welan gum, karaya gum, xanthan gum, scleroglucan, diutan, cellulose and cellulose derivatives, etc. More typical polymers or gelling agents include guar gum, hydroxypropyl guar (HPG), carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, etc. Other examples of polymers include, but are not limited to, phosphomannans, scleroglucans and dextrans. In a preferred embodiment, underivatized guar is employed.

Especially preferred are those derivatized and underivatized guars set forth in U.S. Patent Publication No. 20050272612 published on Dec. 8, 2005, herein incorporated by reference. Such derivatized and underivatized guars are characterized by an intrinsic viscosity greater than about 14 dL/g, more typically greater than 16 dL/g. This viscosity is indicative of higher molecular weight than that normally seen with derivatized and underivatized guars. The guars are obtained by improvements in the processing conditions used to convert the guar split (seed endosperm) to a fine powder.

The cause of the increased molecular weight is due to improved processing conditions used to convert the guar split to a fine powder. Most often, the guar split, being about 0.3 cm in diameter, is partially hydrated and sheared through a roll mill to produce a flake. The flake, being more fragile, can then be dried and pulverized by a high impact mill. Throughout this process, there are times when the guar polymer is subjected to high mechanical shear. A means of obtaining a higher molecular weight polymer occurs at those places of high mechanical shear in the process. The shear process is modified so that the ultimate amount of shear is the same, but the rate of shear is reduced to allow the polymer chains in the split to relax rather than rupture. Therefore by reducing the shearing rate, the degree of rupture is reduced and the polymer molecular weight is higher.

The crosslinking agent used in the aqueous fracturing fluid defined herein may be any crosslinking agent suitable for crosslinking the hydratable polymer. Examples of suitable crosslinking agents include metal ions such as aluminum, antimony, zirconium and titanium-containing compounds, including organotitanates. Examples of suitable crosslinkers may also be found in U.S. Pat. No. 5,201,370; U.S. Pat. No. 5,514,309, U.S. Pat. No. 5,247,995, U.S. Pat. No. 5,562,160, and U.S. Pat. No. 6,110,875, incorporated herein by reference.

In a preferred embodiment, the crosslinking agent is a source of borate ions such as a borate ion donating material. Examples of borate-based crosslinking agents include, but are not limited to, organo-borates, mono-borates, poly-borates, mineral borates, etc.

To obtain a desired pH value, a pH adjusting material preferably is added to the aqueous fluid after the addition of the polymer to the aqueous fluid. Typical materials for adjusting the pH are commonly used acids, acid buffers, and mixtures of acids and bases. Normally, a pH between from about 9.5 to about 11.5 is desired. Thus, it typically is desired to use a buffering agent that is effective to provide the pH for the fluid may be used. Suitable buffering materials include potassium carbonate or mixtures of potassium carbonate and potassium hydroxide.

In an embodiment, the aqueous fluid may be brine, fresh water or salt water. In another embodiment, the aqueous fluid may be produced water, recycled water (such as recovered from a previous frac), industrial waste water or waste water associated with oil production.

The proppant for use in the aqueous fracturing fluid may be any proppant suitable for hydraulic fracturing known in the art. Examples include, but are not limited to, silica, quartz sand grains, glass and ceramic beads, walnut shell fragments, aluminum pellets, nylon pellets, resin-coated sand, synthetic organic particles, glass microspheres, sintered bauxite, mixtures thereof and the like. Alternatively, the proppant may be an ULW proppant. Proppants of intermediate to high strength having an ASG in excess of 2.45 are typically preferred, however, over ULW proppants.

The viscosity of the fracturing fluid described herein, when being pumped from the blender into the wellbore, is typically between from about 10 to about 120 cP at a temperature range between from about 80° F. to about 120° F., though a viscosity between from about 10 to about 50 cP is more preferred.

The loading of the hydratable polymer in the fracturing fluid is from about 6 to about 18 pptg, preferably from about 6 to about 12 pptg. In another preferred embodiment, the polymer loading in the fracturing fluid is from about 6 to about 10 pptg. Low loading means less formation damage. Since use of the fluid enables placement of proppant earlier in the fracturing job, the total volume of fluid required for a job is decreased (in comparison to a similar job using conventional fluids). As such, the fracturing fluid defined herein offers increased fluid efficiency over conventional fluids.

When the hydratable polymer of the aqueous fracturing fluid is that disclosed in U.S. Patent No. 20050272612, it has been found that less loading of polymer is required to provide the fluid the requisite viscosity. In particular, it has been observed that fracturing fluids containing the underivatized or derivatized guar of U.S. Patent Publication No. 20050272612 require a much lower loading of polymer than a substantially similar fracturing fluid (which contains a hydratable polymer other than one disclosed in U.S. Patent Publication No. 20050272612); the two fracturing fluids having equivalent viscosity.

At polymer loadings in excess of about 12 pptg, it is typically desirable to include a breaker in the fluid to assist in the degradation of the hydratable polymer once the fracturing fluid has entered into the fracture. Any suitable breakers are used, including, but not limited to, solid acid precursors, for example, polyglycolic acid (PGA) or polylactic acid (PLA) particles such as beads, plates, or fibers, other delayed acids, delayed oxidizers or delayed bases. In addition, enzymatic breakers known in the art may be used.

The need for friction reducers in the fluid is decreased or eliminated. Since the loading of viscosifying polymer is low, the amount of residual polymer in the formation is decreased. In most cases, the fracturing fluid defined herein (having a minimal of a friction reducer, if any) is less damaging than those conventional fluids which contain commonly used friction reducers, such as polyacrylamides.

The method described herein has particular applicability in the fracturing of tight gas formations, especially those having a permeability less than 1 millidarcy. The method has applicability in those formations having a permeability of less than 100 microdarcy, and even less than 1 microdarcies. The method even has applicability in those formations having a permeability of less than 1 microdarcy and even less than 500 nanodarcies The method described herein has particular applicability in the fracturing of any formation which may be hydraulically fractured with slickwater. In a preferred embodiment, the method described herein is applied to formations of shale and tight gas sands, as well as limestone.

While the method described herein may normally be used in horizontal wells, the method may be used in vertical wells.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLE 1

Figure 2:
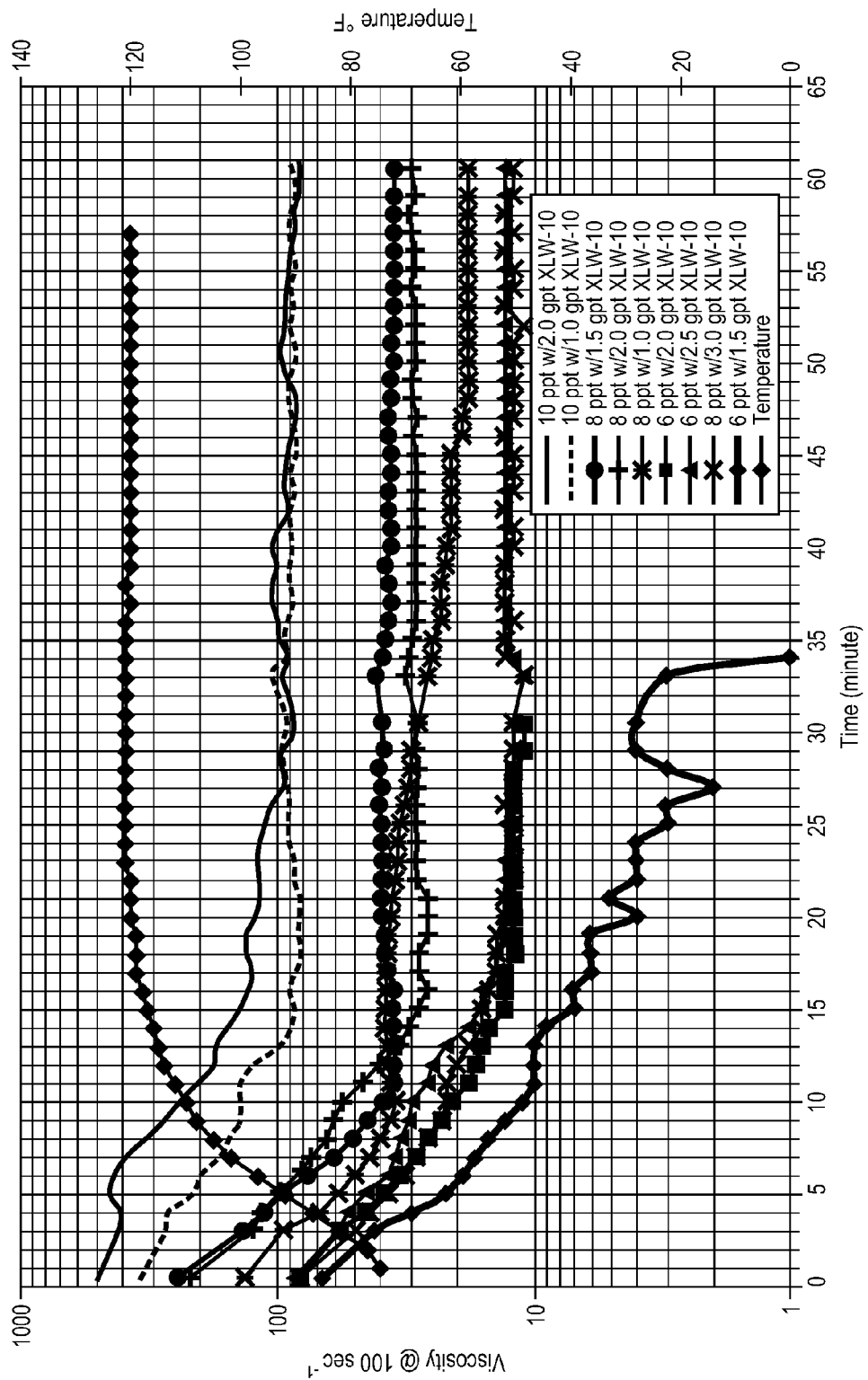
FIGS. 2 through 6 are viscosity and temperature profiles over time of aqueous fracturing fluids defined herein.

A fluid was formulated by mixing at room temperature in a blender underivatized guar having an intrinsic viscosity greater than 16 dL/g, commercially available from Baker Hughes Incorporated as GW-2, a borate crosslinker, commercially available from Baker Hughes Incorporated as XLW-10. The loading of the polymer in the fluid varied to be between 6 and 10 pptg (pounds per thousand gallons). The amount of crosslinker in the fluid was varied to be between 1.0 and 3.0 gptg (gallons per thousand gallons). The fluid was buffered to a pH of 9.0. About 30 ml of the fluid was then placed into a Fann 50 viscometer cup having a bob (BX5) and rotor (R1) cup assembly. The cup was then placed on a Fann 50 viscometer. The sample was sheared by a rate sweep of 100 sec$^{-1}$ for about 1 minute. FIG. 2 shows the results wherein 10 pptg of the fluid with 1 and 2 gptg XLW-10 had initial viscosities of 500 cP and 350 cP, respectively, declining after 5 minutes to about 400 cP and 200 cP, respectively, and after 10 minutes, to about 250 cP and 150 cP, respectively. After 45 minutes, these fluids had viscosities of between 80 and 90 cP. Further, 8 pptg of the fluid having 1.5 and 2 gptg of XLW-10 crosslinker had initial viscosities of 220 and 250 cP, respectively. After 10 minutes, the 8 pptg fluids exhibited 35 to 60 cP. After 45 minutes, the fluids had viscosities of 30 and 35 cP. A 6 pptg fluid having 2-3 gptg XLW-10 had initial viscosities of 80 cP, declining to between 10 and 30 cP after 10 minutes. After 45 minutes, the fluids had viscosities between 10 and 15 cP.

EXAMPLE 2

Figure 3:
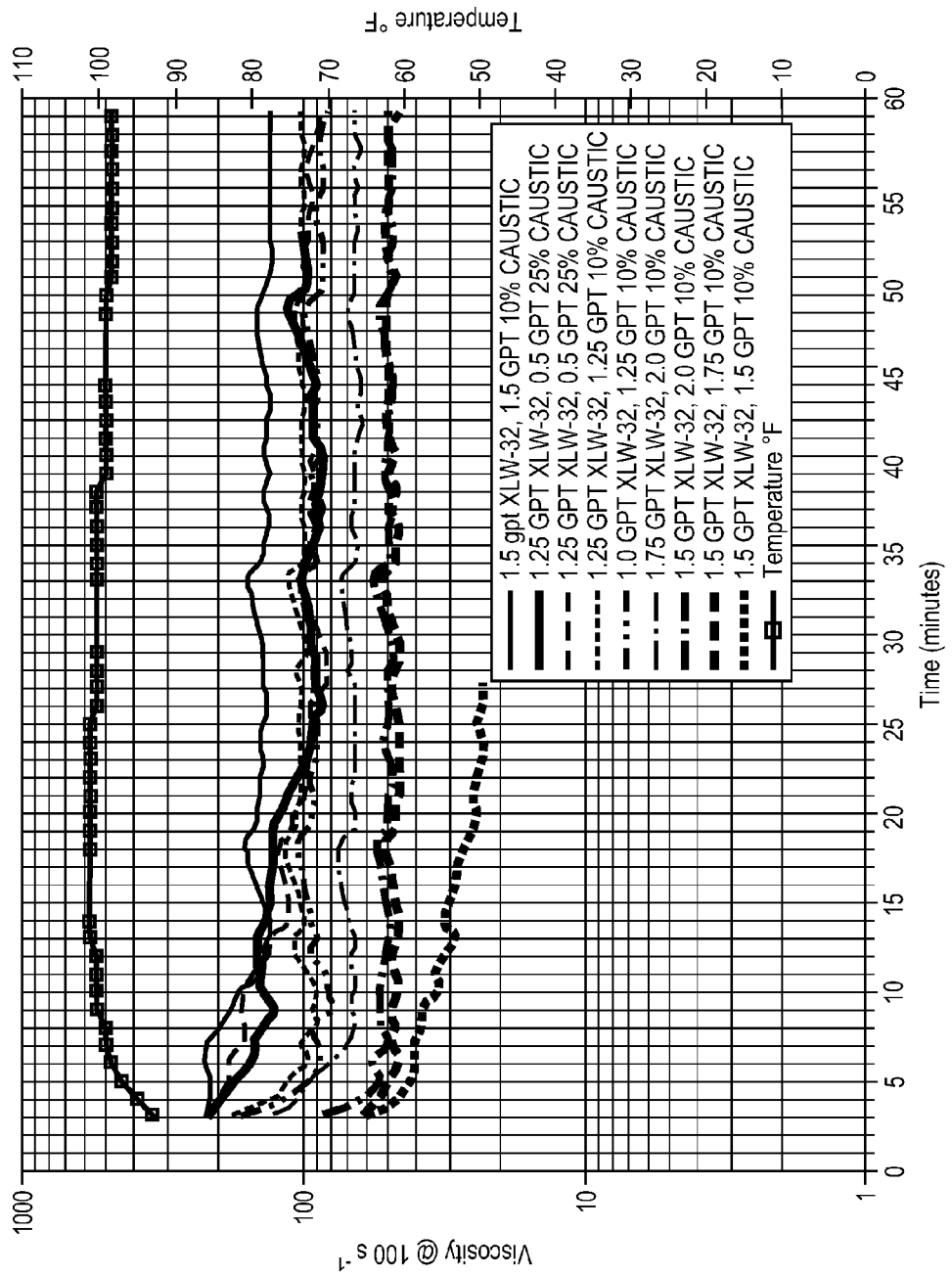

A fluid was formulated by adding GW-2 to water in a blender at room temperature and then adding to the fluid a borate crosslinker, commercially available from Baker Hughes Incorporated as XLW-32. A 10% caustic solution (sodium hydroxide) was then added until pH of the fluid was about 9 and the crosslinked fluid formed in approximately 5 seconds. The loading of the polymer in the fluid was between from 0.5 gptg to 2.0 gptg. The amount of crosslinker in the fluid was varied to be between 1.25 gptg and 1.75 gptg. About 30 ml of a 10 pptg fluid was then placed into a Fann 50 viscometer cup having a bob (BX5) and rotor (R1) cup assembly. The cup was then placed on a Fann 50 viscometer. The sample was sheared by a rate sweep of 100 sec$^{-1}$ for about 1 minute. The stresses associated to each rate were used to calculate the power law indices n and K; n refers to flow behavior index and K refers to consistency index set forth in the American Petroleum Institute's Bulletin RP-39. The fluid viscosity was then calculated by using the n' and k' values. FIG. 3 demonstrates the 10 pptg fluid was acceptable at low polymer loadings at 100° F. and 120° F. particular, FIG. 3 shows that the 10 pptg fluid with 1.5 gpt XLW-32 and 1.5 gptg 10% caustic at 100° F. had a maximum initial viscosity of 225 cP at 100 sec$^{-1}$ and viscosity of 130 cP at 100 sec$^-$ after 60 minutes. Testing of the 10 pptg fluid with 1.25 gptg XLW-32 and 0.5 gptg 10% caustic showed lower initial viscosities between 160 and 175 cP and a maintained viscosity between 80 and 100 cP at 100 sec$^{-1}$ after 60 minutes.

EXAMPLE 3

Figure 4:
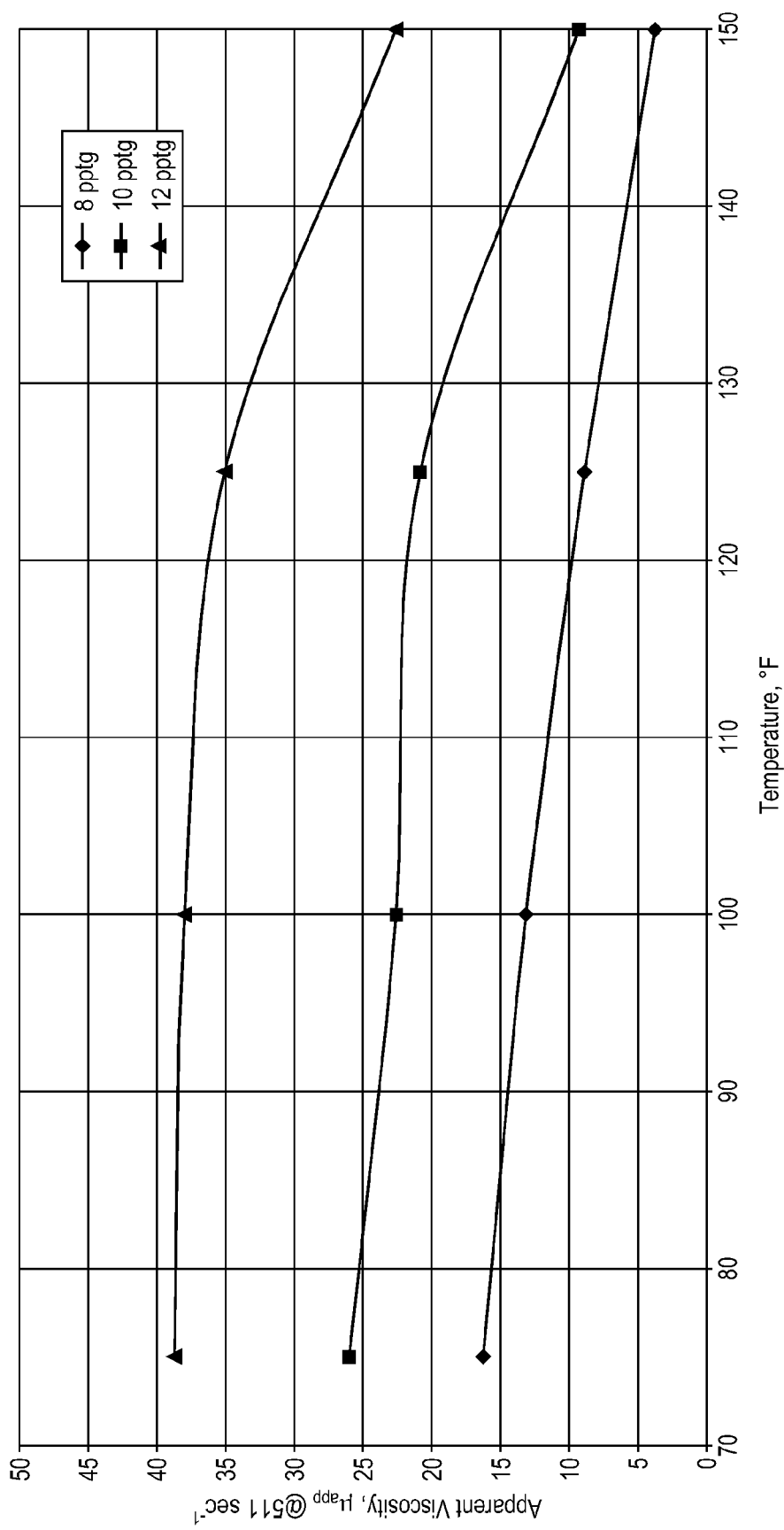

A fluid was formulated by mixing at a temperature range of from 75° F. to 150° F. in a blender water, from 2.0 to 3.0 underivatized guar having an intrinsic viscosity greater than 16 dL/g, commercially available from Baker Hughes Incorporated as GW-2LDF and 3 gpt of a self-buffering borate crosslinker, commercially available from TBC-Brinadd as PfP BXL 0.2. The pH of the fluid was buffered to 9.0. About 30 ml of the fluid was then placed into a Fann 50 viscometer cup having a bob (BX5) and rotor (R1) cup assembly. The cup was then placed on a Fann 50 viscometer. The sample was subjected to a shear rate of 511 sec$^{-1}$. FIG. 4 shows the viscosity profiles of fluids having 8, 10 and 12 pptg. As illustrated, the crosslinked fluid viscosities of each of the example formulations were reduced by 40% to 60% due to increasing the fluid temperature from 75° F. to 150° F.

EXAMPLE 4

Figure 5:
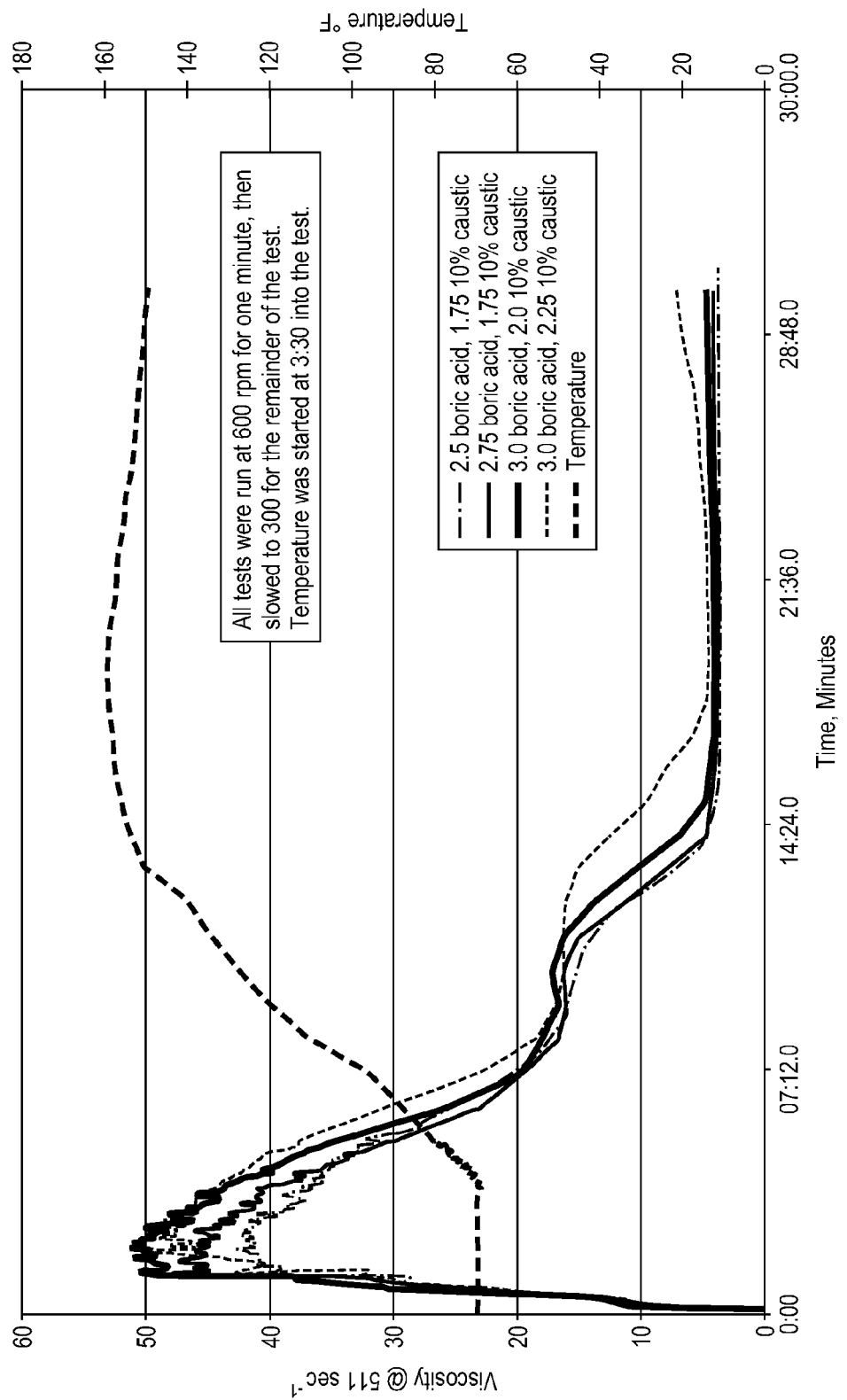

A fluid was formulated by adding GW-2 to water in a blender at room temperature and then adding to the fluid a self-buffering borate crosslinker, commercially available from Baker Hughes Incorporated as XLW-10. The crosslinked fluid formed in approximately 5 seconds. The loading of the polymer in the fluid was between from 6 pptg to 10 gptg. The amount of crosslinker in the fluid was varied to be between 1.5 gptg and 3.0 gptg. About 30 ml of a 10 pptg fluid was then placed into a Fann 50 viscometer cup having a bob (BX5) and rotor (R1) cup assembly. The cup was then placed on a Fann 50 viscometer. The sample was sheared by a rate sweep of 100 sec$^{-1}$ for about 1 minute. The stresses associated to each rate were used to calculate the power law indices n and K; n refers to flow behavior index and K refers to consistency index set forth in the American Petroleum Institute's Bulletin RP-39. The fluid viscosity was then calculated by using the n' and k' values. FIG. 5 shows the viscosity profiles of each of the fluids as the temperatures was increased from ambient to 120° F. Initial viscosities for the example fluids at 75° F. ranged from 70 cP for the 6 pptg GW-2/1.5 gpt XLW-10 formulation, to 500 cP for the 10 pptg GW-2/2.0 gpt XLW-10 case. Fluid temperatures were observed to approach the desired test temperature of 120° F. after 20 minutes, at which time the 8 pptg polymer formulations exhibited viscosities between 20 cP and 30 cP. Viscosities of the 6 pptg formulations after 20 minutes were approximately 10 cP.

EXAMPLE 5

Figure 6:
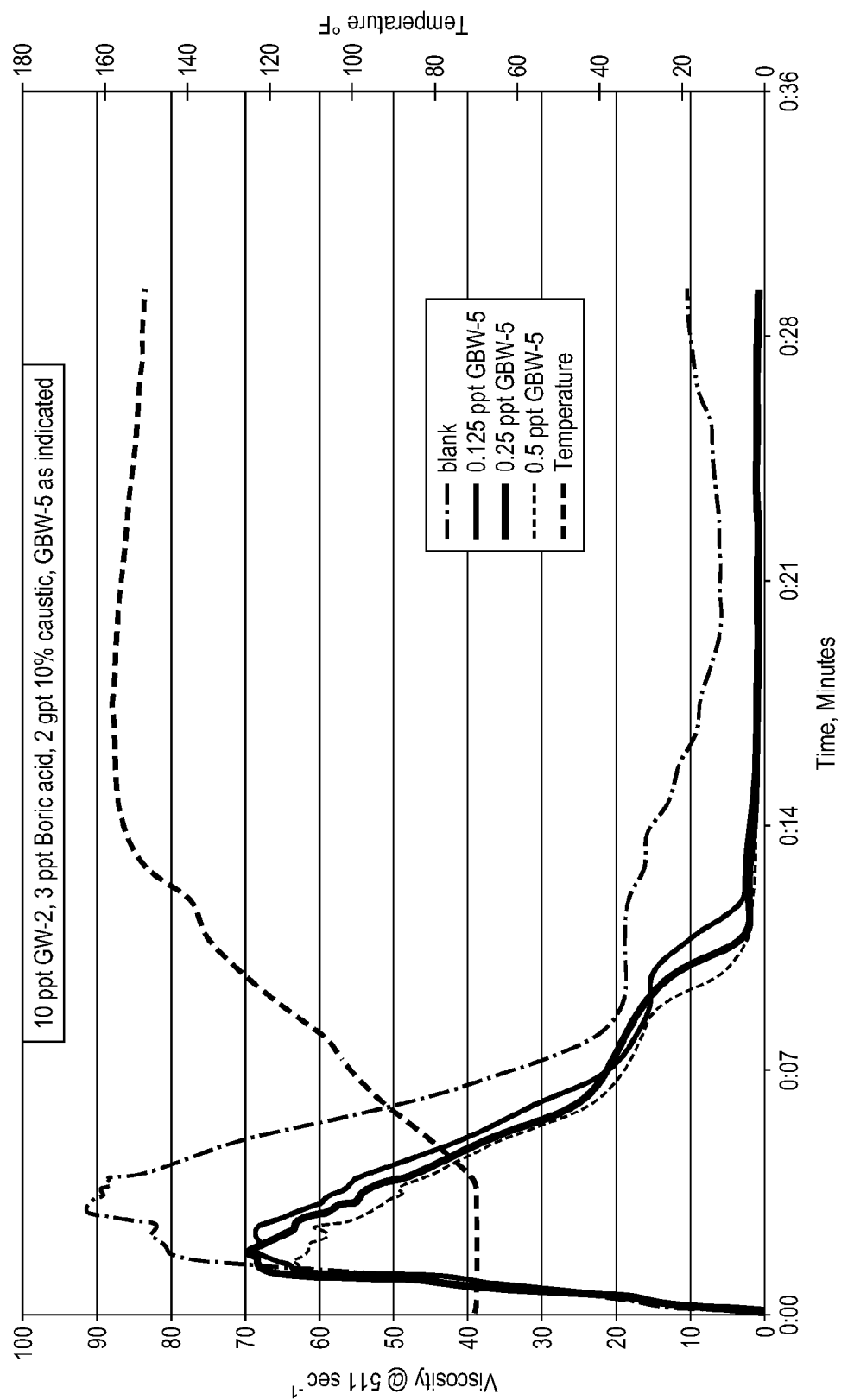

A fluid was formulated by adding 10 pptg of GW-2 to water in a blender at room temperature and then adding 3 ppt of boric acid as a crosslinker, 2 gptg of 10% caustic to bring the pH to about 9.5, and 0.125 ppt to 0.5 ppt of ammonium persulfate breaker, available from Baker Hughes Incorporated as GBW-5. The crosslinked fluid began to form in approximately 5 seconds. About 30 ml of a 10 pptg fluid was then placed into a Fann 50 viscometer cup having a bob (BX5) and rotor (R1) cup assembly. The cup was then placed on a Fann 50 viscometer. The sample was sheared by a rate sweep of 100 sec$^{-1}$ for about 1 minute. The stresses associated to each rate were used to calculate the power law indices n and K; n refers to flow behavior index and K refers to consistency index set forth in the American Petroleum Institute's Bulletin RP-39. The fluid viscosity was then calculated by using the n' and k' values. FIG. 6 shows the viscosity profiles of each of the fluids as the temperatures was increased from ambient to 150° F. Viscosities for the example fluids were approximately 40 cP after about 30 seconds, and peaked at greater than 60 cP between 2 minutes and 5 minutes. After approximately 10 minutes, the temperature had increased to about 120° F., and the viscosities of each of the fluids declined to between 10 and 15 cP. After 20 minutes, the temperature was at the target of 150° F. and the fluids viscosities were observed to be less than 10 cP for each of the fluid formulations including breaker.

From the foregoing, it will be observed that numerous variations and modifications may be effected without departing from the true spirit and scope of the novel concepts of the invention.

What is claimed is:

1. A method of fracturing a subterranean formation penetrated by a wellbore, comprising the steps of:
   formulating a viscous fracturing fluid by mixing together an aqueous fluid, a hydratable polymer, a crosslinking agent and proppant;
   pumping the viscous fracturing fluid through an entrance site in the wellbore into the reservoir; and propagating fractures within the reservoir while decreasing the viscosity of the viscous fracturing fluid distally from the entrance site wherein at least one of the following conditions prevail at in situ conditions during propagation of the fractures:
   (a) the apparent viscosity of the fracturing fluid 100 feet from the entrance site is less than 10 percent of the apparent viscosity of the fracturing fluid at the entrance site;
   (b) the apparent viscosity of the fracturing fluid 15 minutes after introduction into the entrance site is less than 15% of the apparent viscosity of the fracturing fluid at the entrance site; or
   (c) the apparent viscosity of the fracturing fluid is less than 10 cP within 15 minutes after being introduced through the entrance site.

2. The method of claim 1, wherein the apparent viscosity of the fracturing fluid 100 feet from the entrance site is less than 10 percent of the apparent viscosity of the fracturing fluid at the entrance site; site.

3. The method of claim 2, wherein the apparent viscosity of the fracturing fluid 100 feet from the entrance site is less than 5 percent of the viscosity of the fracturing fluid at the entrance site.

4. The method of claim 1, wherein the apparent viscosity of the fluid 200 feet from the entrance site is less than 1 percent of the viscosity of the fracturing fluid at the entrance site.

5. The method of claim 1, wherein the subterranean formation is shale.

6. The method of claim 1, wherein the subterranean formation is a tight gas formation.

7. The method of claim 1, wherein the hydratable polymer, in the aqueous fluid, has an intrinsic viscosity greater than about 14 dL/g.

8. The method of claim 1, wherein the hydratable polymer in the fracturing fluid loads from about 6 to about 18 pptg.

9. The method of claim 8, wherein the hydratable polymer in the fracturing fluid loads from about 8 to about 12 pptg.

10. The method of claim 9, wherein the hydratable polymer in the fracturing fluid loads from about 6 to about 10 pptg.

11. The method of claim 1, wherein the hydratable polymer is guar, derivatized guar or derivatized cellulose.

12. The method of claim 1, wherein the fracturing fluid further contains a buffering agent effective to provide a pH for the fluid in the range from about 9.5 to 11.5.

13. The method of claim 1, wherein the fracturing fluid further comprises at least one breaker.

14. The method of claim 1, wherein the apparent viscosity of the fracturing fluid 15 minutes after introduction into the entrance site is less than 15% of the apparent viscosity of the fracturing fluid at the entrance site.

15. The method of claim 14, wherein the apparent viscosity of the fracturing fluid 15 minutes after introduction into the entrance site is less than 10% of the apparent viscosity of the fracturing fluid at the entrance site.

16. The method of claim 15, wherein the apparent viscosity of the fracturing fluid 30 minutes after introduction into the entrance site is less than 5% of the apparent viscosity of the fracturing fluid at the entrance site.

17. The method of claim 1, wherein the apparent viscosity of the fracturing fluid is less than 10 cP within 15 minutes after being introduced through the entrance site.

18. The method of claim 17, wherein the apparent viscosity of the fracturing fluid is less than 5 cP within 15 minutes after being introduced through the entrance site.

19. The method of claim 18, wherein the apparent viscosity of the fracturing fluid is less than 3 cP within 30 minutes after being introduced through the entrance site.

20. A method of fracturing a subterranean formation penetrated by a wellbore, comprising:
   (a) pumping a viscous fracturing fluid comprising an aqueous fluid, a hydratable polymer, a crosslinking agent and proppant into the wellhead of the wellbore and through an entrance site in the wellbore into the reservoir;
   (b) propagating fractures within the formation; and
   (c) decreasing the apparent viscosity of the fluid distally from the entrance site during propagation of the fractures such that at least one of the following conditions prevail:
      (i) the apparent viscosity of the fracturing fluid 100 feet from the entrance site is less than 10 percent of the apparent viscosity of the fracturing fluid at the entrance site;
      (ii) the apparent viscosity of the fracturing fluid 15 minutes after introduction into the entrance site is less than 15% of the apparent viscosity of the fracturing fluid at the entrance site; or
      (iii) the apparent viscosity of the fracturing fluid is less than 10 cP within 15 minutes after being introduced through the entrance site.

21. The method of claim 20, wherein the aqueous fluid, when pumped into the wellhead, has a viscosity from about 10 to about 120 cP.

22. The method of claim 20, wherein the subterranean formation is shale.

23. The method of claim 20, wherein the hydratable polymer in the fracturing fluid loads from about 6 to about 18 pptg.

24. A method of fracturing a subterranean formation penetrated by a wellbore, wherein the permeability of the subterranean formation is between from about 10 nanodarcies to about 1.0 mD, the method comprising:
   (a) forming a viscous fracturing fluid by mixing water, viscosifying polymer, crosslinking agent and proppant, wherein the viscous fracturing fluid has a viscosity between from about 10 to about 120 cP at a temperature range between from about 80° F. to about 125° F.;

(b) pumping the viscous fracturing fluid into the wellhead of the wellbore while minimizing settling of proppant from the fluid during the pumping;
(c) transporting the viscous fracturing fluid through an entrance site in the wellbore;
(d) propagating fractures in the formation; and
(e) decreasing the viscosity of the viscous fracturing fluid upon the fluid entering the entrance site such that at least one of the following conditions prevail:
  (i) the apparent viscosity of the fracturing fluid 100 feet from the entrance site is less than 10 percent of the apparent viscosity of the fracturing fluid at the entrance site;
  (ii) the apparent viscosity of the fracturing fluid 15 minutes after introduction into the entrance site is less than 15% of the apparent viscosity of the fracturing fluid at the entrance site; or
  (iii) the apparent viscosity of the fracturing fluid is less than 10 cP within 15 minutes after being introduced through the entrance site.

* * * * *